United States Patent
Wu et al.

(10) Patent No.: US 10,944,854 B2
(45) Date of Patent: Mar. 9, 2021

(54) ELECTRONIC DEVICE

(71) Applicant: BEIJING XIAOMI MOBILE SOFTWARE CO., LTD., Beijing (CN)

(72) Inventors: Yuelin Wu, Beijing (CN); Chihyi Cheng, Beijing (CN); Jun Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,257

(22) Filed: Nov. 29, 2019

(65) Prior Publication Data
US 2020/0358889 A1 Nov. 12, 2020

(30) Foreign Application Priority Data

May 10, 2019 (CN) .......................... 201910388533.4

(51) Int. Cl.
*H05K 11/00* (2006.01)
*H04M 1/02* (2006.01)
*H04N 5/225* (2006.01)
*H04N 5/232* (2006.01)

(52) U.S. Cl.
CPC ........ *H04M 1/0264* (2013.01); *H04N 5/2252* (2013.01); *H04N 5/23238* (2013.01)

(58) Field of Classification Search
CPC .................................................... H05K 11/00
See application file for complete search history.

(56) References Cited

U.S. PATENT DOCUMENTS

2017/0026634 A1 1/2017 Mirlay
2019/0166312 A1* 5/2019 Tashayyod ........... A61B 5/0077

FOREIGN PATENT DOCUMENTS

EP 1085769 A2 3/2001

OTHER PUBLICATIONS

European Search Report in EP Application No. 19214368.3, dated Jun. 9, 2020.

* cited by examiner

*Primary Examiner* — Jerry Wu
(74) *Attorney, Agent, or Firm* — Syncoda LLC; Feng Ma

(57) ABSTRACT

An electronic device includes: a device body defining an accommodating space therein; a camera module arranged on the device body, and configured to be positioned to be a first orientation and a second orientation, the camera module being configured to be located at the accommodating space of the device body and have a first photographing range at the first orientation, and to have a second photographing range at the second orientation; and an adjusting module arranged on the device body, and configured to drive the camera module at the first orientation to move outwards from the accommodating space, to move at least a part of the camera module outside the device body, and further to allow the camera module to be inclined to the second orientation.

18 Claims, 7 Drawing Sheets

ELECTRONIC DEVICE

CROSS-REFERENCE TO RELATED APPLICATION

The present disclosure claims priority to Chinese Patent Application No. 201910388533.4, filed on May 10, 2019, the disclosure of which is hereby incorporated by reference in its entirety.

BACKGROUND

More and more image capturing functions are realized by electronic devices. In some applications, an electronic device such as a mobile phone can use a more powerful camera to support more image capturing functions. In some applications, the number of the cameras used by the electronic device has increased from an original single one, to two, three or even more, referred to as a multi-camera solution.

SUMMARY

The present disclosure relates generally to the field of camera technologies, and more specifically to an electronic device.

According to embodiments of the present disclosure, there is provided an electronic device, including: a device body defining an accommodating space therein; a camera module arranged on the device body, and configured to be positioned to be a first orientation and a second orientation, the camera module being configured to be located at the accommodating space of the device body and have a first photographing range at the first orientation, and to have a second photographing range at the second orientation; and an adjusting module arranged on the device body, and configured to drive the camera module at the first orientation to move outwards from the accommodating space, to move at least a part of the camera module outside the device body, and further to allow the camera module to be inclined to the second orientation.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

References will now be made in detail to exemplary embodiments, examples of which are illustrated in the accompanying drawings. The following description refers to the accompanying drawings in which the same numbers in different drawings represent the same or similar elements, unless specified otherwise. The implementations set forth in the following description of the exemplary embodiments do not represent all implementations consistent with the present disclosure. Instead, they are merely examples of apparatuses and methods consistent with several aspects of the present disclosure as recited in the appended claims.

Terms used in the present disclosure are only for the purpose of describing specific embodiments, and should not be construed to limit the present disclosure. As used in the present disclosure and the appended claims, "a" and "the" in a singular form intend to include a plural form, unless clearly indicated in the context otherwise. It should also be understood that, as used herein, the term "and/or" represents and contains any or all possible combinations of one or more associated listed items.

It should be understood that, although terms such as first, second and third are used herein for describing various kinds of information, such information should not be limited to these terms. These terms are only used for distinguishing the same type of information from each other. For example, without departing from the scope of the present disclosure, a first information may also be called as a second information, and similarly, the second information may also be called as the first information. Depending on the context, the term "if" may be construed to mean "when" or "upon" or "in response to determining".

Figure 1:
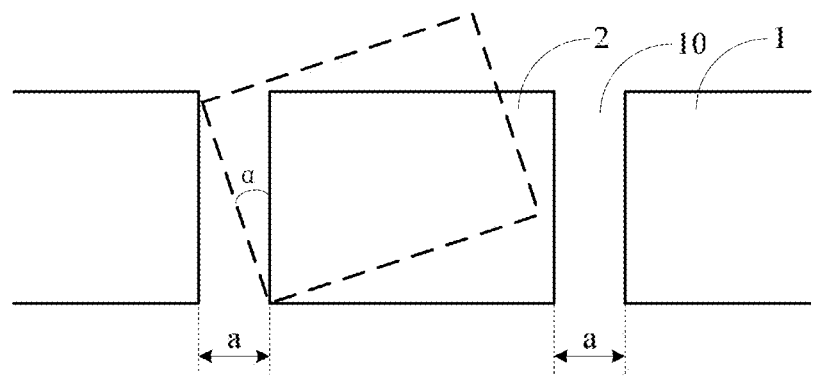
FIG. 1 is a schematic view of controlling a camera module to be inclined in a related art.

FIG. 1 is a schematic view of a camera module controlled to incline in a related art. As illustrated in FIG. 1, an electronic device may include a device body 1 and a camera module 2 arranged on the device body 1. In some scenes, it is desirable to adjust and control the camera module 2 such that the camera module 2 can be inclined at a certain angle. For example, as illustrated in FIG. 1, the camera module 2 is inclined leftwards at an angle α. Assuming that the device body 1 is provided with an accommodating space 10 for arranging the camera module 2 therein, and thus a gap between the camera module 2 and a left inner wall of the accommodating space 10 should be no less than a, in order to meet an inclination requirement of the camera module 2.

Otherwise, the camera module 2 cannot be inclined or cannot be inclined at the angle α under an impediment of the left inner wall. Similarly, if the camera module 2 is intended to be inclined rightwards at an angle α, a gap between the camera module 2 and a right inner wall of the accommodating space 10 should also be no less than a. Cases in other directions are similar, and will not be repeated herein.

However, when the gap between the camera module 2 and the accommodating space 10 is too large, the large gap will affect the aesthetics of the electronic device, and also allow foreign matters to enter easily, thus increasing difficulties of dustproof and waterproof, and hence reducing the reliability of the electronic device.

Therefore, according to the inclination requirement of the camera module 2, various embodiments of the present disclosure provide corresponding structural improvements to solve the problem of the excessive gap in the related art. Detailed descriptions will be made in combination with embodiments as follows.

Figure 2A:
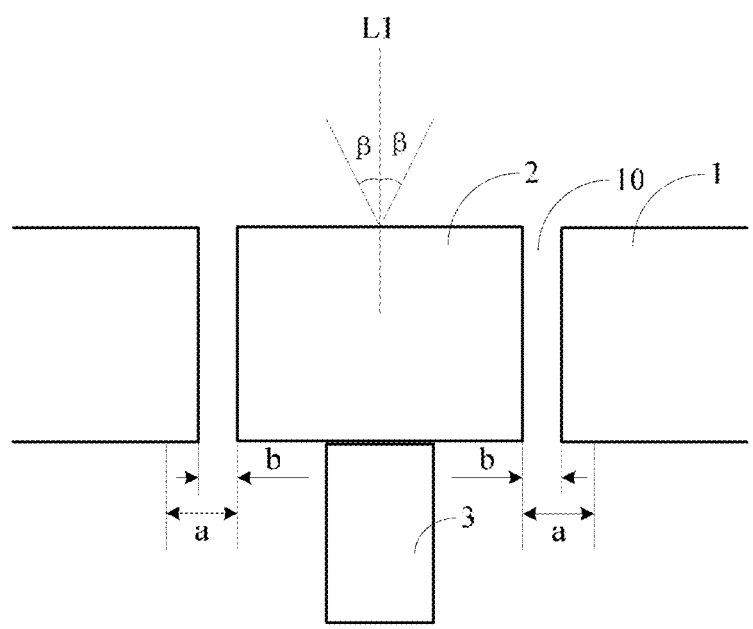
FIG. 2A is a first schematic view of controlling a camera module to be inclined according to some embodiments of the present disclosure.
Figure 2B:
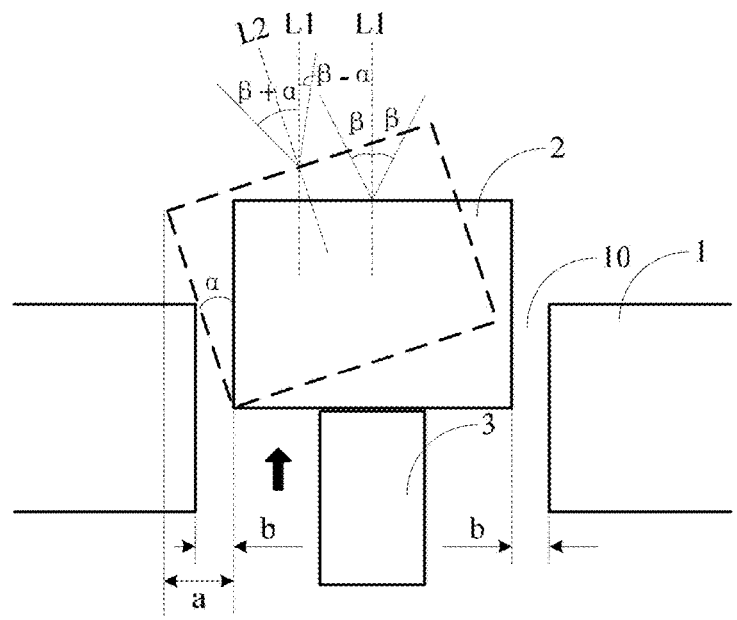
FIG. 2B is a second schematic view of controlling a camera module to be inclined according to some embodiments of the present disclosure.

FIG. 2A and FIG. 2B are schematic views of a camera module controlled to incline according to some embodiments of the present disclosure. As illustrated in FIG. 2A and FIG. 2B, an electronic device of the present disclosure includes a device body 1, a camera module 2 and an adjusting module 3. The device body 1 is provided with an accommodating space 10, and the camera module 2 is received and arranged in the accommodating space 10. The adjusting module 3 may be fitted with the camera module 2 to control the camera module 2 to switch between a first orientation and a second orientation, that is, from the first orientation to the second orientation, or from the second to the first orientation.

When the camera module 2 is at the first orientation, the camera module 2 is located in the accommodating space 10. For example, the camera module 2 may be located at a bottom of the accommodating space 10, as illustrated in FIG. 2A, and in this case, a lens of the camera module 2 is oriented in a direction L1. Supposing the direction L1 is 0 degree, a direction on a right side of the direction L1 is a positive direction and a direction on a left side of the direction L1 is a negative direction, when a field-of-view angle (FOV) of the camera module 2 is 2β, a first photographing range of the camera module 2 may be considered as $[-\beta, \beta]$.

The adjusting module 3 may move the camera module 2 at the first orientation outwards from the accommodating space 10, thus moving at least a part of the camera module 2 outside the device body 1, such as a position illustrated in FIG. 2B. Furthermore, the adjusting module 3 may incline the camera module 2 (for example, inclined leftwards at an angle α), such that the camera module 2 is switched to the second orientation represented with a dotted line in FIG. 2B. In this case, the lens of the camera module 2 is orientated in a L2 direction instead of the L1 direction, and the camera module 2 has a second photographing range at the second orientation, which may be denoted as $[-(\beta+\alpha), \beta-\alpha]$. Therefore, through the adjusting module 3 controlling the camera module 2 to switch between the first orientation and the second orientation, the photographing range provided by the camera module 2 may be changed, so as to meet a user's image capturing requirements.

The adjusting module 2 first drives the at least part of the camera module 2 to move outside the device body 1 and then controls the camera module 2 to incline. Compared with directly controlling the camera module 2 to incline as illustrated in FIG. 1, under the case of the same inclination with the angle α, a gap between the camera module 2 and the accommodating space 10 is reduced from a to b in the embodiment illustrated in FIG. 2B, and thus a width decrease of 2(a−b) in total along a left and right direction is achieved, because the gap illustrated in FIG. 1 needs to be fitted with the whole side wall of the camera module 2, while the gap illustrated in FIG. 2B only needs to be fitted with a part of the side wall of the camera module 2. If the adjusting module 2 even can move the camera module 2 completely out of the accommodating space 10, there may be nearly no gap between the camera module 2 and the accommodating space 10 (the gap may be as small as possible, as long as a movement of the camera module 2 is not hindered).

In some embodiments, the camera module 2 may include only one camera, or a plurality of cameras configured to move synchronously, and references may be made to the embodiment illustrated in FIG. 2A and FIG. 2B. In this case, although a size of the FOV formed by a single camera or a size of a combined FOV formed by the plurality of cameras of the camera module 2 remains unchanged, the inclination of the camera module 2 may change the photographing range, so as to meet the user's image capturing requirements in some scenes. For example, under the case that the electronic device does not move, a panoramic image capturing is realized by means of controlling the camera module 2 to move. The user only needs to concern how to keep the electronic device stationary without moving the electronic device, which helps improve an image capturing stability and an image capturing quality.

Figure 3:
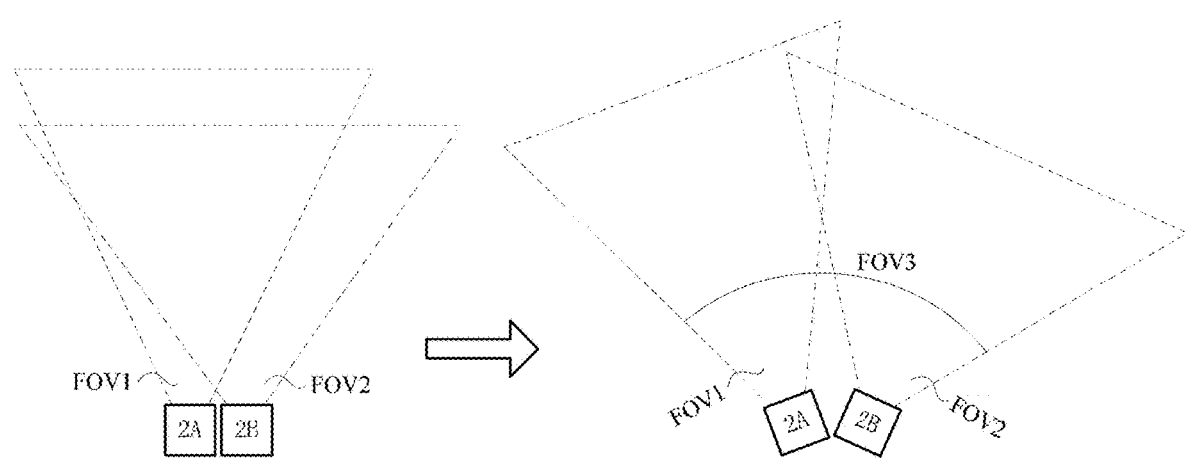
FIG. 3 is a schematic view of controlling a plurality of cameras to move according to some embodiments of the present disclosure.

In some embodiments, the camera module 2 may include a plurality of cameras, and the adjusting module 3 may drive some or all of the plurality of cameras to move, respectively. For example, FIG. 3 is a schematic view of controlling the plurality of cameras to move according to some embodiments of the present disclosure. As illustrated in FIG. 3, assuming that the camera module 2 includes a camera 2A and a camera 2B, a left portion of FIG. 3 illustrates a case that the camera module 2 is at the first orientation, and a right portion of FIG. 3 illustrates a case that the camera module 2 is at the second orientation.

When the camera module 2 is at the first orientation, the lens of the camera 2A and the camera 2B both face forwards (i.e. upwards in FIG. 3), and a FOV1 of the camera 2A coincides with or substantially coincides with a FOV2 of the camera 2B (for example, a coincidence degree reaches a preset ratio), so as to achieve an image capturing effect such as a portrait with bokeh. When the camera module 2 is at the second orientation, the camera 2A is inclined leftwards and the camera 2B is inclined rightwards, such that the FOV1 of the camera 2A deviates from the FOV2 of the camera 2B, and finally the FOV1 and the FOV2 are in an adjacent state or a partially overlapped state. Therefore, the FOV1 and the FOV2 can form a combined field-of-view angle FOV3. That is, the combined field-of-view angle FOV3 may be formed after the camera 2A and camera 2B are inclined, respectively, and the FOV3 is larger than the single FOV1 or FOV2. It may be seen that the second photographing range of the camera module 2 at the second orientation is obviously larger than the first photographing range at the first orientation, so as to meet a wide-angle image capturing requirement of the user.

As mentioned above, only a part of the plurality of cameras included in the camera module 2 may be only inclined. For example, when the camera module 2 includes the camera 2A and the camera 2B mentioned above, only the camera 2A can be inclined leftwards and the camera 2B cannot be inclined, such that a relatively large combined field-of-view angle can be still formed by means of the inclination of the camera 2A.

When the number of the cameras included in the camera module 2 is larger than two, the plurality of cameras may be arranged in parallel, that is, arranged in sequence along a straight line. For example, when the camera module 2 includes three cameras, the three cameras may be arranged in sequence along an edge of the electronic device, such as a transverse edge or a longitudinal edge, which is not limited in the present disclosure.

Figure 4:
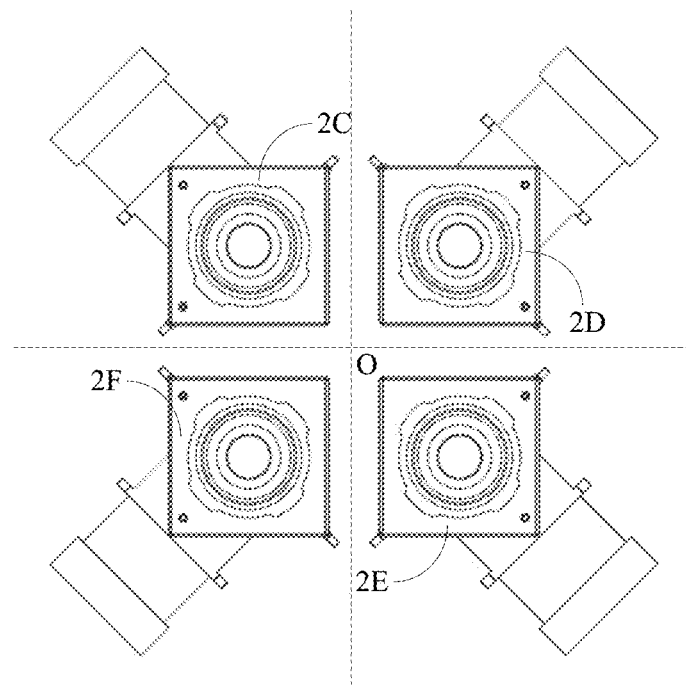
FIG. 4 is a schematic view of a plurality of cameras centrosymmetrically arranged according to some embodiments of the present disclosure.

In some embodiments, the plurality of cameras included in camera module 2 may be centrosymmetrically arranged around a central point. For example, FIG. 4 is a schematic view illustrating a centrosymmetric arrangement of a plurality of cameras according to some embodiments of the present disclosure. As illustrated in FIG. 4, when the camera module 2 includes cameras 2C, 2D, 2E and 2F, the four cameras 2C-2F may be centrosymmetrically arranged around a central point O. Thus, when the camera module 2 is switched from the first orientation to the second orientation, one end of each camera close to the central point O moves in a direction running away from the central point O and/or the other end of each camera far from the center point O moves in a direction approaching the central point O.

Figure 5:
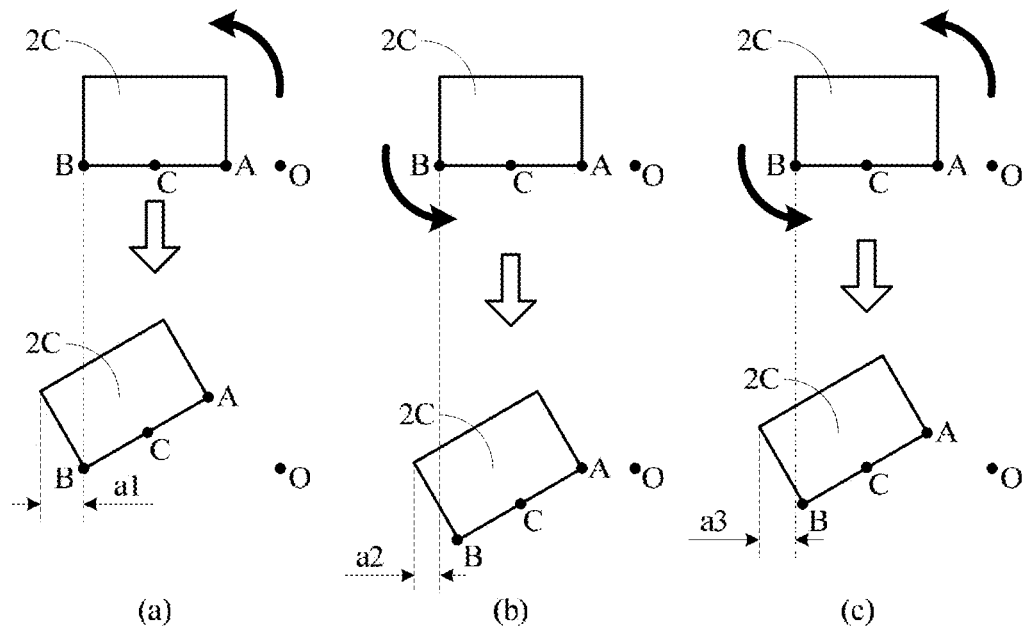
FIG. 5 is a schematic view illustrating an inclination of a camera according to some embodiments of the present disclosure, in which three different cases are illustrated in panel (a), panel (b), and panel (c), respectively.

FIG. 5 is a schematic view of an inclination of a camera according to some embodiments of the present disclosure. Taking the camera 2C in FIG. 4 as an example, the camera 2C includes a right end close to the center point O, and the right end has a point A; the camera 2C includes a left end far from the center point O, and the left end has a point B; and the camera 2C also includes a point C located between the point A and the point B. In FIG. 5, panel (a) (i.e., the left side portion of FIG. 5), the camera 2C may rotate around an axis at the point B, such that the right end of the camera 2C close to the center point O moves leftwards, that is, in a direction running away from the center point O, and when inclined to a preset angle, the camera 2C occupies a space of a width A1 on the left side. In FIG. 5, panel (b) (i.e., the middle portion of FIG. 5), the camera 2C may rotate around an axis at the point A, such that the left end of the camera 2C far from the center point O moves rightwards, that is, in a direction approaching the center point O, and when inclined to the preset angle, the camera 2C occupies a space of a width A2 on the left side. In FIG. 5, panel (c) (i.e., the right side portion of FIG. 5), the camera 2C may rotate around an axis at the point C, such that the right end of the camera 2C close to the center point O moves leftwards, that is, in the direction running away from the center point O, while the left end of the camera 2C far from the center point O moves rightwards, that is, in the direction approaching the center point O. When inclined to the preset angle, the camera 2C occupies a space of a width A3 on the left side.

In the three cases illustrated in FIG. 5, the space on the left side occupied by the camera 2C has a relationship: a2<a3<a1. Although the camera 2C occupies the largest space on the left side in FIG. 5, panel (a), and the smallest space on the left in FIG. 5, panel (b), the camera 2C does not occupy a bottom space in FIG. 5, panel (a), so the electronic device does not need to provide a corresponding reserved space for the camera 2C in a vertical direction. However, the camera 2C needs to occupy the bottom space in FIG. 5, panel (b), such that the electronic device needs to provide the camera 2C with the corresponding reserved space in the vertical direction. The camera 2C needs to occupy a certain bottom space in FIG. 5, panel (c), but the occupancy is better than that of the embodiment illustrated in FIG. 5, panel (b).

Certainly, the adjusting module 3 in the present disclosure may first push at least a part of the camera module 2 out of the accommodating space 10 of the device body 1, such that the electronic device may form an available space in the vertical direction at the bottom of camera module 2, even if the electronic device does not provide the reserved space or only provides less reserved space, so as to meet a requirement of the camera module 2C occupying the space in the vertical direction, as described above. In other words, when the electronic device does not provide the reserved space in the vertical direction, if the at least part of the camera module 2 is not pushed out of the accommodating space 10 by the adjusting module 3, the camera module 2 may only be inclined according to the case in FIG. 5, panel (a), thus causing a large lateral space occupation (the left side in FIG. 5). However, if the at least part of the camera module 2 is pushed out of the accommodating space 10 is by the adjusting module 3, the corresponding space in the vertical direction can be provided for the camera module 2, such that the camera module 2 can be inclined according to the case in FIG. 5, panel (b) or panel (c), thus resulting in a small lateral space occupation.

Figure 6:
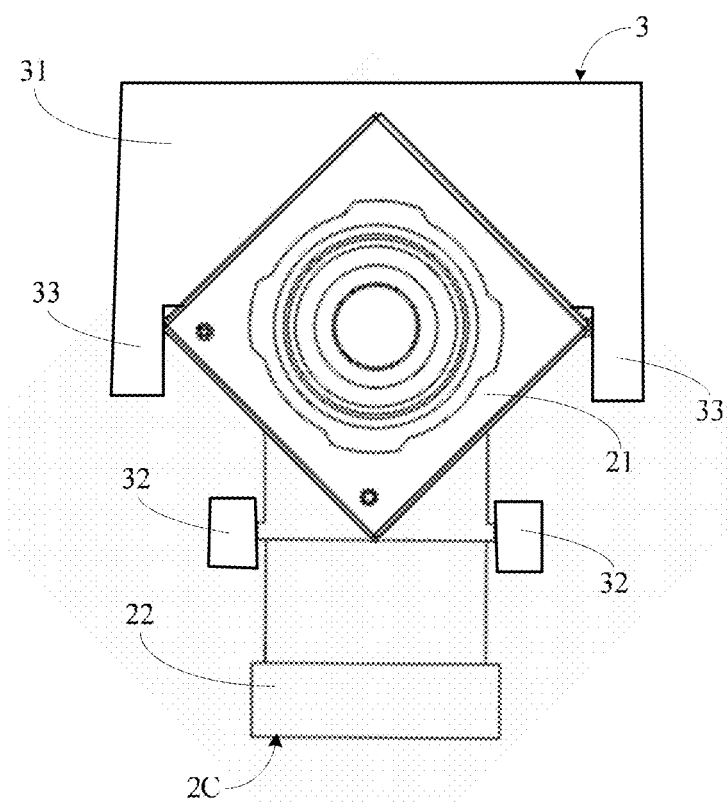
FIG. 6 is an assembly view of a camera and an adjusting module according to some embodiments of the present disclosure.
Figure 7:
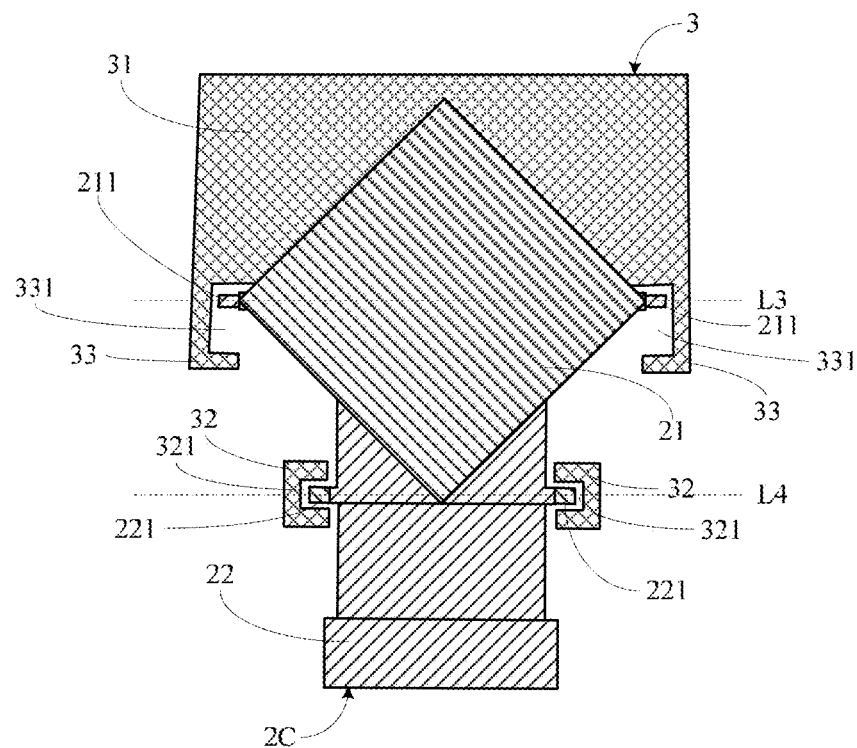
FIG. 7 is a sectional view corresponding to FIG. 6.

FIG. 6 is an assembly view of a camera and an adjusting module according to some embodiments of the present disclosure. FIG. 7 is a sectional view corresponding to FIG. 6. Still taking the camera 2C included in the camera module 2 as an example, as illustrated in FIGS. 6-7, the camera 2C includes a photographing portion 21 and a fixing portion 22 connected with the photographing portion 21. For example, the fixing portion 22 may be a flexible flat cable protruding outward from the photographing portion 21. The photographing portion 21 is provided with a first group of protrusions 211 protruding along a first axis L3. The first axis L3 divides the photographing portion 21 into a first part (that is, a portion below the first axis L3 in FIG. 7) far from the fixing portion 22, and a second part (that is, a portion above the first axis L3 is FIG. 7) close to the fixing portion 22. The fixing portion 22 is provided with a second group of protrusions 221 protruding along a second axis L4. The second axis L4 divides the fixing portion 22 into a third part (that is, a portion above the second axis L4 in FIG. 7) close to the photographing portion 21, and a fourth part (that is, a portion below the second axis L4 is FIG. 7) far from the photographing portion 21. The adjusting module 3 includes a lifting part 31 configured to reciprocate along the vertical direction and fitted with the first part of the photographing portion 21, a lifting limit part 32 including a vertical sliding slot 321 fitted with the second group of protrusions 221, and an inclining limit part 33 fixedly arranged on the lifting part 31 and including a horizontal sliding slot 331 fitted with the first group of protrusions 211.

Figure 8:
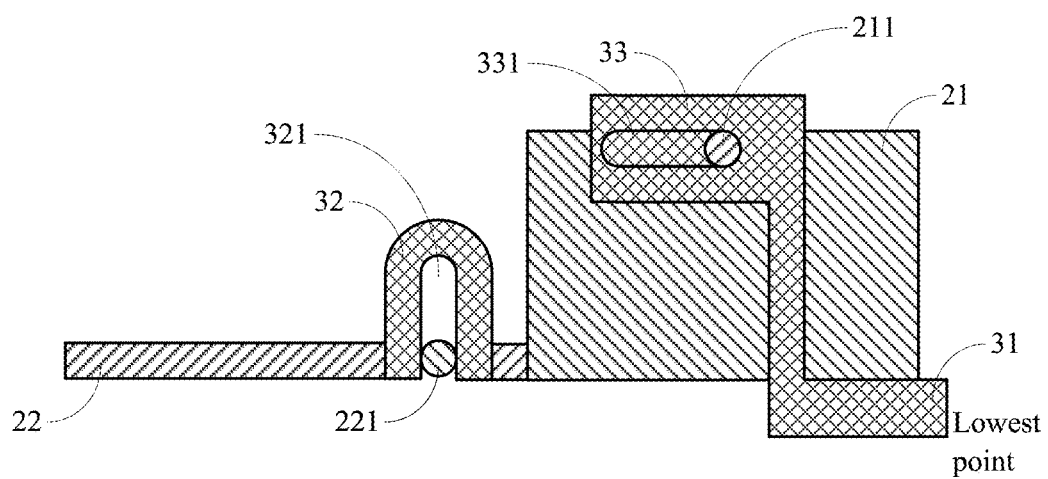
FIG. 8 is a first schematic view of an adjusting module driving a camera to move according to some embodiments of the present disclosure.
Figure 9:
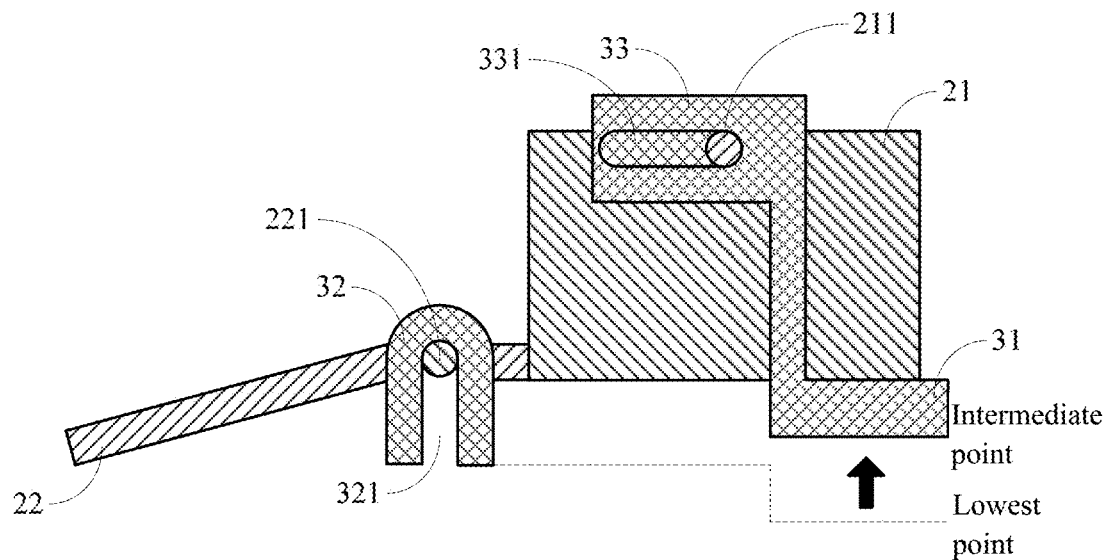
FIG. 9 is a second schematic view of an adjusting module driving a camera to move according to some embodiments of the present disclosure.
Figure 10:
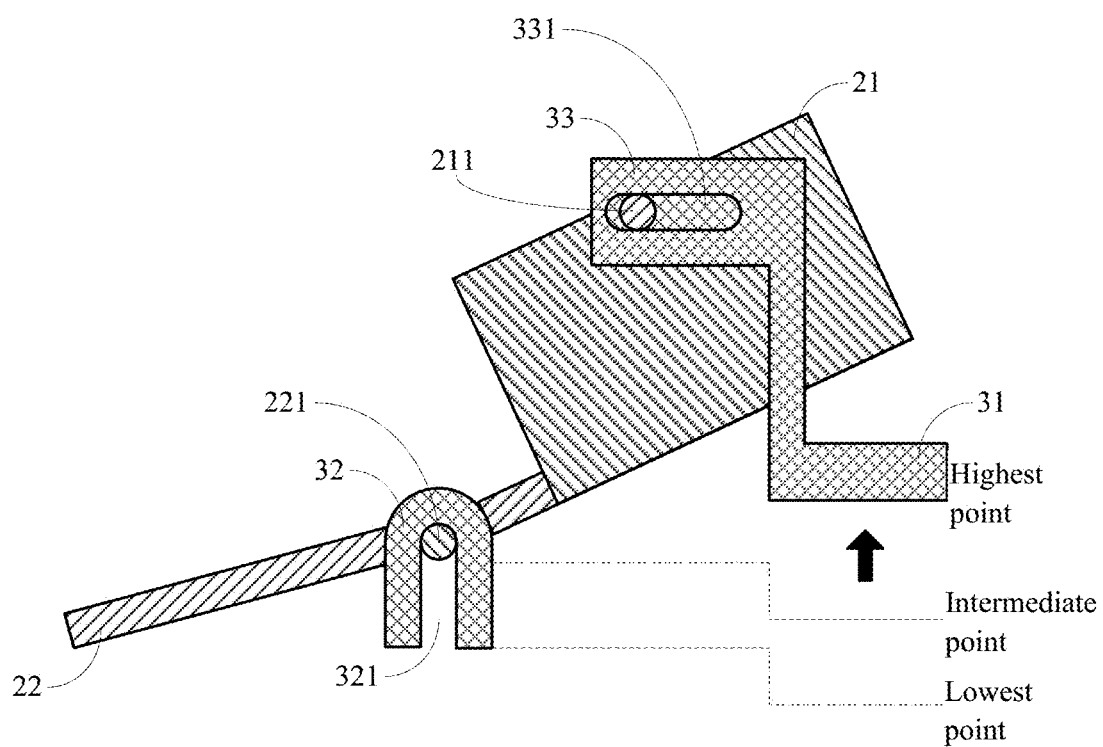
FIG. 10 is a third schematic view of an adjusting module driving a camera to move according to some embodiments of the present disclosure.

Accordingly, FIG. 8, FIG. 9, and FIG. 10 are schematic views of an adjusting module driving a camera to move according to some embodiments of the present disclosure. The camera module 2 is at the first orientation in the embodiment illustrated in FIG. 8. In this case, the lifting part 31 is located at the lowest point, the second group of protrusions 221 are located at a bottom of the vertical sliding slot 321, and the first group of protrusions 211 are located at a first end (that is, a right end in FIGS. 8-10) of the horizontal sliding slot 331 far from the fixing portion 22. Driven by the adjusting module 3, a movement of the camera 2C may be divided into following two stages.

As illustrated in FIG. 8 and FIG. 9, in a first stage, the lifting part 31 rises from the lowest point to an intermediate point (that is, a point between the lowest point and the highest point, but not necessarily a midpoint therebetween).

During this process, the lifting part 31 directly pushes the first part of the photographing portion 21 to rise, and the photographing portion 21 further drives the fixing portion 22 to rise until the second group of protrusions 221 of the fixing portion 22 rise from the bottom of the vertical sliding slot 321 to a top thereof. Then, the fixing portion 22 is prevented from further rising under a limiting effect of the vertical sliding slot 321.

As illustrated in FIG. 9 and FIG. 10, in a second stage, the lifting part 31 continues rising from the intermediate point to the highest point. Although the lifting part 31 exerts an upward lifting force on the first part of the photographing portion 21, the photographing portion 21 is restrained by the fixing portion 22 and cannot continue rising, such that the first group of protrusions 211 rotate in the horizontal sliding slot 331 and move from the first end (that is, the right end in FIGS. 8-10) of the horizontal sliding slot 331 far from the fixing portion 22 to a second end (that is, a left end in FIG. 8, FIG. 9, and FIG. 10) of the horizontal sliding slot 331 close to the fixing portion 22. During this process, the photographing portion 21 is inclined leftwards around the first axis L3. It can be seen that, a fitting face between the lifting part 31 and the photographing portion 21 should not be beyond the first part, so as to ensure that the photographing portion 21 can be inclined around the first axis L3 in the second stage.

In some embodiments, when the camera module 2 includes a plurality of cameras, the adjusting module 3 may include a plurality of the lifting parts 31 as illustrated in FIGS. 6-10, so as to be fitted with the plurality of cameras, respectively, such that the adjusting module 3 can control any one or more cameras to incline according to requirements, thus providing a high flexibility.

Figure 11:
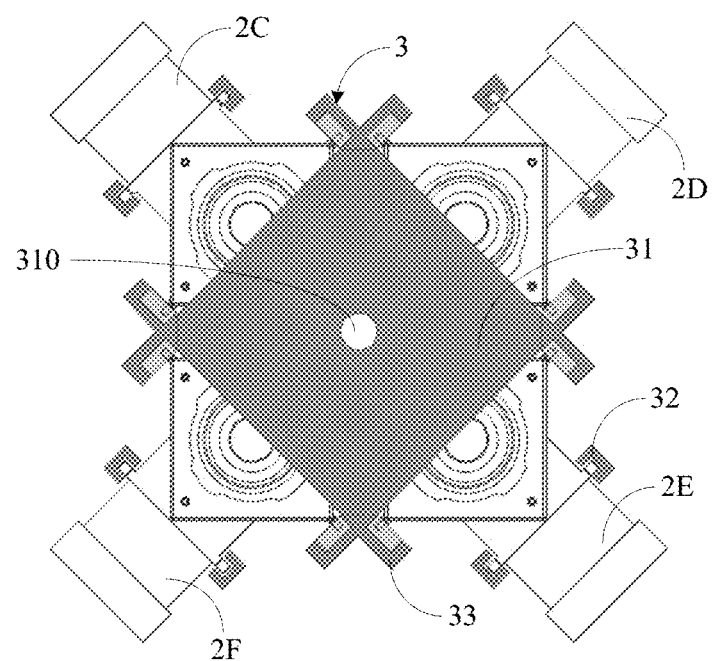
FIG. 11 is a schematic view of an adjusting module controlling a plurality of cameras to move according to some embodiments of the present disclosure.

In some embodiments, when the camera module 2 includes a plurality of cameras, the adjusting module 3 may include one lifting part 31 as illustrated in FIG. 11, which is located among the plurality of cameras 2C-2F included in the camera module 2, so as to be fitted with the photographing portions of the plurality of cameras 2C-2F at the same time, thereby synchronously controlling all the cameras 2C-2F to incline.

In a technical solution of the present disclosure, a driving force may be provided to the adjusting module 3 in various ways. For example, the driving force is provided by a stepping motor. For another example, the electronic device may be provided with a driving member for the adjusting module 3, such that the user may exert an external force through the driving member so as to provide the driving force, or other ways may be used, which is not limited by the present disclosure. When the stepping motor is used, in order to reduce the occupancy of the vertical space in the electronic device and avoid increasing a thickness of the electronic device, the stepping motor may be arranged horizontally, such that a rotating shaft of the stepping motor is perpendicular to a lifting direction of the camera module 2. Moreover, a driving direction of the rotating shaft may be converted to be parallel to the lifting direction by means of a worm structure or a helical gear, and then the rotating shaft is fitted with a lead screw. The lead screw may be fitted with a threaded hole 310 provided in the lifting part 31 as illustrated in FIG. 11, so as to drive the lifting part 31 to reciprocate along the vertical direction.

In addition, it is easy to understand that, the fit between the first group of protrusions 211 and the horizontal sliding slot 331 as well as the fit between the second group of protrusions 221 and the vertical sliding slot 321 may also be replaced by other forms based on a fit between a sliding piece and a guide rail, a roller fit or a gear engagement and so on, which is not limited in the present disclosure.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The various modules, circuits, device components, units, blocks, or portions may have modular configurations, or are composed of discrete components, but nonetheless can be referred to as "units," "modules," or "portions" in general. In other words, the "modules," "circuits," "components," "blocks," "portions," or "units" referred to herein may or may not be in modular forms.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as some only, with a true scope and spirit of the present disclosure being indicated by the following claims.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An electronic device, comprising:
a device body defining an accommodating space therein;
a camera module arranged on the device body, and configured to be positioned to be a first orientation and a second orientation, the camera module being configured to be located at the accommodating space of the device body and have a first photographing range at the first orientation, and to have a second photographing range at the second orientation; and
an adjusting module arranged on the device body, and configured to drive the camera module at the first orientation to move outwards from the accommodating space, to move at least a part of the camera module outside the device body, and further to allow the camera module to be inclined with respect to the device body to the second orientation,
wherein
the camera module comprises a camera, the camera comprises a photographing portion and a fixing portion connected with the photographing portion, the photographing portion is provided with a first group of protrusions protruding along a first axis, the first axis divides the photographing portion into a first part distal from the fixing portion and a second part proximal to the fixing portion, the fixing portion is provided with a second group of protrusions protruding along a second axis, and the second axis divides the fixing portion into a third part proximal to the photographing portion and a fourth part distal from the photographing portion;
the adjusting module comprises:
a lifting part configured to reciprocate along a vertical direction and fitted with the first part of the photographing portion;
a lifting limit part comprising a vertical sliding slot fitted with the second group of protrusions, the second group of protrusions being configured to rise from a bottom of the vertical sliding slot to a top thereof during a process of the lifting part rising from a lowest point to an intermediate point; and
an inclining limit part fixedly arranged on the lifting part and comprising a horizontal sliding slot fitted with the first group of protrusions, the first group of protrusions being configured to rise along with the lifting part during the process of the lifting part rising from the lowest point to the intermediate point, and further configured to rotate in the horizontal sliding slot and move from a first end of the horizontal sliding slot distal from the fixing portion to a second end of the horizontal sliding slot proximal to the fixing portion during a process of the lifting part rising from the middle point to a highest point, such that the photographing portion is inclined around the first axis.

2. The electronic device according to claim 1, wherein the camera module comprises a plurality of cameras.

3. The electronic device according to claim 2, wherein field-of-view angles of the plurality of cameras coincide or substantially coincide with each other under the first orientation, and correspond to the first photographing range.

4. The electronic device according to claim 2, wherein field-of-view angles of the plurality of cameras are spliced into a combined field-of-view angle at the second orientation, the combined field-of-view angle is larger than a field-of-view angle of each camera, and the combined field-of-view angle corresponds to the second photographing range.

5. The electronic device according to claim 2, wherein the plurality of cameras are arranged in parallel.

6. The electronic device according to claim 2, wherein the plurality of cameras are centrosymmetrically arranged around a central point.

7. The electronic device according to claim 6, wherein when the camera module is switched from the first orientation to the second orientation, an end of each camera proximal to the central point moves in a direction running away from the central point.

8. The electronic device according to claim 6, wherein when the camera module is switched from the first orientation to the second orientation, an end of each camera distal from the center point moves in a direction approaching the central point.

9. The electronic device according to claim 6, wherein when the camera module is switched from the first orientation to the second orientation, one end of each camera proximal to the central point moves in a direction running away from the central point, and the other end of each camera distal from the center point moves in a direction approaching the central point.

10. The electronic device according to claim 2, wherein when the camera module is switched from the first orientation to the second orientation, a part of the plurality of cameras or all the plurality of cameras are inclined.

11. The electronic device according to claim 1, wherein the fixing portion comprises a flexible flat cable protruding outward from the photographing portion.

12. The electronic device according to claim 1, wherein the lifting part is arranged at a bottom of the photographing portion.

13. The electronic device according to claim 1, wherein the camera module comprises a plurality of cameras, and one lifting part is provided and arranged among the plurality of cameras of the camera module to be fitted with the photographing portions of the plurality of cameras simultaneously.

14. The electronic device according to claim 1, wherein the camera module comprises a plurality of cameras, a plurality of lifting parts are provided, and each lifting part is fitted with the photographing portion of at least one of the plurality of cameras.

15. The electronic device according to claim 14, wherein the camera module is configured to change the photographing range by changing an inclination without changing a size of a field-of-view angle (FOV) formed by a single camera or a size of a combined FOV formed by the plurality of cameras.

16. The electronic device according to claim 15, wherein the electronic device is configured to capture a panoramic image by controlling the camera module to move while keeping the electronic device stationary.

17. A method of image capturing with the electronic device of claim 1, the method comprising:
positioning the camera module at the first orientation to obtain the first photographing range;
positioning the camera module at the second orientation to obtain the second photographing range; and
moving at least a part of the camera module outside the device body, and further to allow the camera module to be inclined with respect to the device body to the second orientation.

18. The method according to claim 17, further comprising capture a panoramic image by controlling the camera module to move while keeping the electronic device stationary.

* * * * *